April 8, 1952 J. S. WOLFE 2,592,505
WELDING TOOL
Filed March 17, 1949

John S. Wolfe
INVENTOR

BY
ATTORNEY

Patented Apr. 8, 1952

2,592,505

UNITED STATES PATENT OFFICE 2,592,505

WELDING TOOL

John S. Wolfe, Milwaukee, Wis.

Application March 17, 1949, Serial No. 81,995

2 Claims. (Cl. 219—8)

This invention relates to welding tools and the like and particularly to the provision therein of means for protecting the operator against obnoxious fumes such as commonly develop during a welding process.

When welding beneath a stationary ventilating hood of ample size and capacity to effectually dispose of such fumes, the operator is amply protected. But welding is more commonly performed in situ or under conditions which render it impossible or unfeasible to utilize such a hood, so that the operator is generally exposed to the ill effects of the fumes in spite of efforts heretofore made to overcome this difficulty. It has been proposed to equip welding tools with fume removal devices, but as heretofore designed, such devices require positioning close to the point of weld where they seriously interfere with proper observance of the work and in some instances render it difficult or even impossible to reach the point to be welded.

One object of the present invention is to provide a welding tool having a thoroughly practical means for effecting fume disposal without impairing accessibility, performance or observance of the work.

Other objects and advantages will appear, expressed or implied, from the following description of a welding tool constructed in accordance with the present invention.

Figure 1:
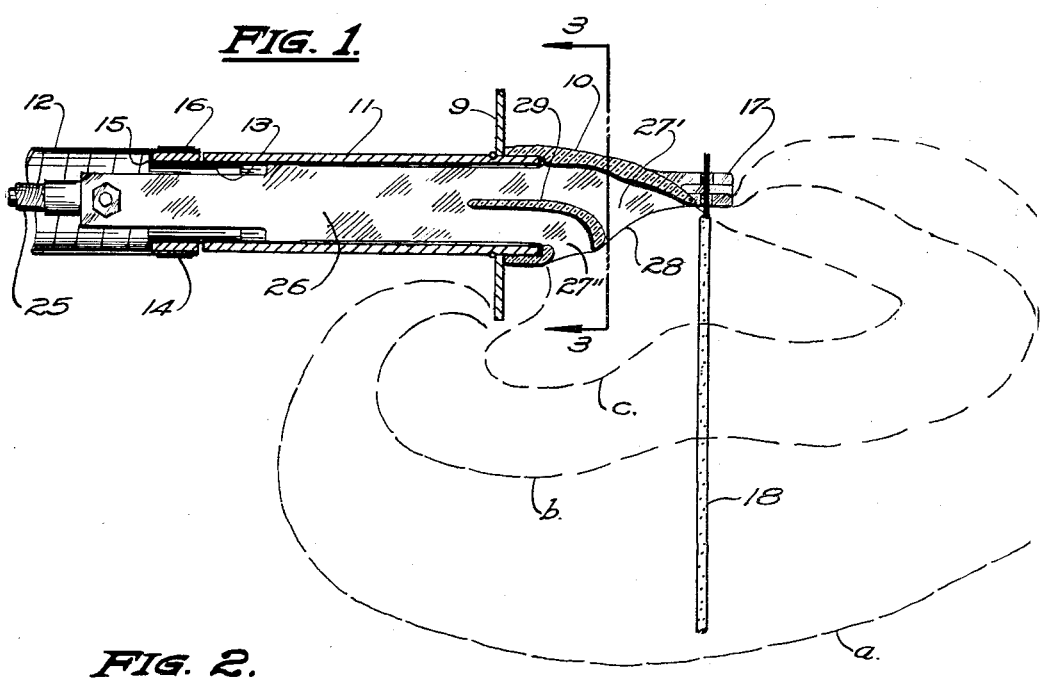
Figure 1 is a vertical longitudinal sectional view of a welding tool embodying the present invention.
Figure 2:
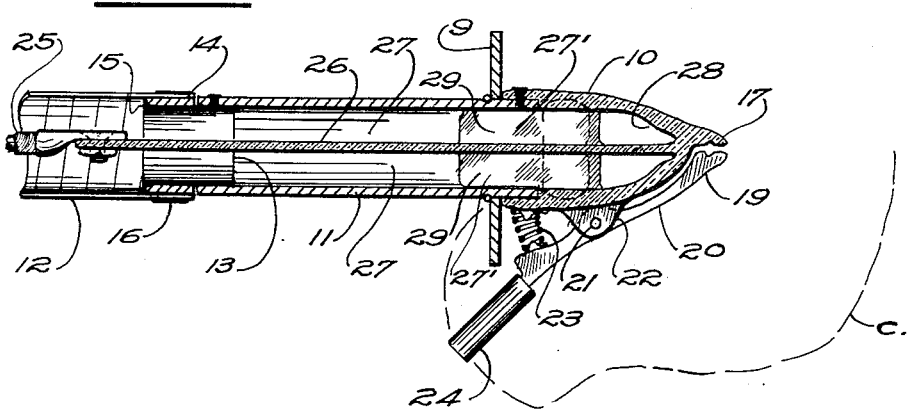
Fig. 2 is a horizontal longitudinal sectional view thereof.
Figure 3:
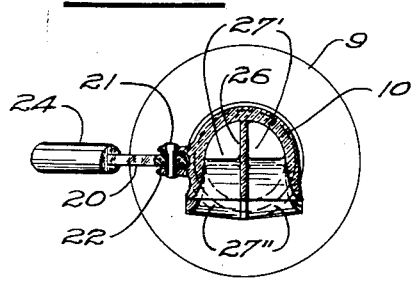
Fig. 3 is a vertical transverse sectional view taken substantially along the line 3—3 of Fig. 1.

For purposes of illustration and explanation the invention is shown and will be described as embodied in an electric welding tool of the electrode holder type, although it is applicable to other kinds of tools, such as gas welding devices.

The electrode holder shown comprises a hollow metal head 10 fixed to one end of a rigid tubular handle 11 of insulating material, the other end of the handle being swivelly connected to a length of flexible hose 12 for a purpose to be later described. In this instance the swivel connection comprises a ferrule 13 fixed within and projecting from the rear end of the handle 11 and providing support for a ring 14 rotatably fitted on the ferrule and confined thereon by an end flange 15. The hose 12 is releasably secured to the ring 14 by suitable means such as a conventional hose clamp 16. The handle 11 and head 10 are thus rotatably adjustable with respect to the hose 12.

The forward end of the handle 11 is preferably equiped with a shield in the form of a plate or disk 9 of insulating material, which also serves as a support or tool rest when the device is not in use.

The projecting end of the head 10 is preferably tapered as indicated and provided with a longitudinally projecting lug 17 fashioned to form the stationary jaw of a suitable clamp for the support of a conventional welding rod 18. The cooperating movable jaw 19 of the clamp is carried by the forward end of a lever 20 rockably supported, as at 21, on a lug 22 projecting from the side of the head 10. The clamp is normally retained in rod-clamping position by a suitable compression spring 23 acting on the rear end of the lever 20, the latter being equipped with a conveniently arranged insulated handle 24 which may be manipulated to open the clamp and release the rod 18.

The rod 18 is electrically energized through the clamp jaws 17 and 19 and head 10, the latter being electrically connected to a conventional supply cable 25 through a bus bar 26 that extends rearwardly from the head 10 through the handle 11 and to which the cable is attached. In this instance the bar 26 comprises a relatively thin metal strip of a width to engage the interior of the handle in a manner to divide the same into separate longitudinal channels 27 and to also provide additional support for the head 10.

In the device shown the head 10 is fashioned to provide an intake nozzle capable of exhausting air from a widely extended zone, such as that indicated by the broken contour lines a, b and c. The extent of this zone and its position over the point of weld renders it effective to entrap and remove the obnoxious fumes emanating from the welding process in much the same manner as would a ventilating hood of like extent similarly positioned, and making it possible to thus dispose of the fumes without requiring a close positional relation between the nozzle and the point of the weld.

In order to develop this extended exhaust zone an intake orifice 28 is provided in the under side of the head 10, this orifice having an effective area materially greater than the cross-sectional area of the head 10 and being disposed at an acute angle and in close proximity to the longitudinal axis of the head, and the hose 12 is connected to a fan or other appropriate exhauster capable of inducing a high velocity air flow through the head and orifice. A linear air velocity of several thousand feet per minute through the orifice 28 has been found sufficiently high for the purpose indicated, although the actual velocity employed may vary dependent upon the extent or spread of the exhaust zone desired.

The shape or pattern of the exhaust zone is determined by the shape or contour of the orifice 28 and of the air channel or channels terminating therein. In order to effect a high velocity flow throughout the orifice 28 the latter is preferably divided. In this instance the orifice is divided by the forward end of the vertical strip 26 and further divided by horizontal webs 29 extending lengthwise of and at opposite sides of the strip 26. The forward ends of the webs 29 are shown curved downward so as to enter the orifice 28 in a direction substantially normal thereto. As a result of this construction two upper, outwardly flared channels 27' are provided capable of exhausting air from a region extending beyond the outer end and opposite sides of the nozzle 10, and two lower, longitudinally curved channels 27'' are provided capable of exhausting air from a region extending beyond the inner end and opposite sides of the nozzle.

The nozzle shown, energized by an air exhauster in the manner above described, is capable of developing an air exhaust zone of a particular pattern, substantially as indicated by the broken lines a, b and c, having an effective spread several times greater than that of the orifice 28. The outer contour line a represents a locus of points at which the air flows at a linear velocity of about one hundred feet per minute in a direction substantially normal to line a and generally toward line b. As the air converges toward the locus of points represented by line b its velocity rapidly increases and in passing across line b toward the locus of points represented by line c the velocity increases at a rapidly increasing rate until a velocity of several thousand feet per minute is attained as the air enters the orifice 28 and channels 27' and 27''. It has been found that the inward air flow throughout the fringes of the exhaust zone indicated by broken line a may be relied upon to pick up and carry away any fumes that may emanate or occur within a reasonable distance beneath that zone or adjacent the fringes thereof.

From the foregoing it will be noted that a thoroughly practical welding tool has been provided having means for the effective disposal of fumes emanating from the welding process, and in which the active end of the weld rod is unencumbered by anything that could interfere with proper application thereof to the point of weld or in any manner interfere with proper observance of the welding process. It will also be noted that thet tool handle 11 is protected against excessive temperatures since any heat developed therein is effectively removed by the continuous ample flow of air therethrough throughout the welding operation. It will be further noted that the swivel connection between the hose and tool makes possible that freedom of movement so important in adjusting the weld rod to the weld as the work progresses.

Various changes may be made in the embodiment of the invention hereinabove specifically described without departing from or sacrificing the advantages of the invention as defined in the appended claims.

I claim:

1. In a device of the character described a wall member forming a hollow elongated nozzle, parts of said wall member being longitudinally curved and cooperating to form an outwardly flaring intake opening in the side of said nozzle adjacent an end thereof, air exhaust means connected to the opposite end of said nozzle for inducing air to enter said opening and to flow through said nozzle, and lingitudinally extending dividing walls within said nozzle adjacent said side opening.

2. In a device of the character described a wall member forming a hollow elongated nozzle, parts of said wall member being longitudinally curved and cooperating to form an outwardly flaring intake opening in the side of said nozzle, adjacent one end thereof said wall member also being longitudinally tapered toward the intake end of said nozzle, and longitudinally extending dividing walls within said nozzle adjacent said opening.

JOHN S. WOLFE.

REFERENCES CITED

The following references are of record in the file of this patent:

UNITED STATES PATENTS

| Number | Name | Date |
| --- | --- | --- |
| 790,943 | Weber | May 30, 1905 |
| 928,158 | Smethurst | July 13, 1909 |
| 1,093,049 | Hawley | Apr. 14, 1914 |
| 1,405,106 | Edge | Jan. 31, 1922 |
| 1,936,408 | Persson | Nov. 21, 1933 |
| 1,997,387 | McCord | Apr. 9, 1935 |
| 2,162,019 | Johnson | June 13, 1939 |
| 2,284,648 | Foreman | June 2, 1942 |
| 2,389,969 | Fadeley | Nov. 27, 1945 |

FOREIGN PATENTS

| Number | Country | Date |
| --- | --- | --- |
| 618,649 | Germany | Sept. 12, 1935 |
| 704,956 | Germany | Apr. 10, 1941 |
| 7,915 | Great Britain | July 4, 1907 |
| 227,196 | Switzerland | Aug. 16, 1943 |